United States Patent [19]

Mahrus et al.

[11] Patent Number: 5,156,729

[45] Date of Patent: Oct. 20, 1992

[54] METHOD OF MAKING A PLAIN BEARING SLIDING LAYER

[75] Inventors: Duraid Mahrus; Ademir Carubelli, both of Sao Paulo, Brazil

[73] Assignee: Metal Leve, S.A., Sao Paulo, Brazil

[21] Appl. No.: 430,676

[22] Filed: Nov. 1, 1989

[30] Foreign Application Priority Data

Nov. 1, 1988 [BR] Brazil .................... 8805772

[51] Int. Cl.⁵ .......................... C25D 3/58; C25D 5/18; C25D 7/10
[52] U.S. Cl. .................... 205/104; 205/149; 205/176; 205/241
[58] Field of Search .............. 204/23, 40, DIG. 9; 205/104, 149, 176, 241

[56] References Cited

U.S. PATENT DOCUMENTS

| | | | |
|---|---|---|---|
| 3,753,664 | 8/1973 | Klingenmaier et al. | 29/191 |
| 3,940,320 | 2/1976 | Kardos et al. | 204/52.1 |
| 3,956,078 | 5/1976 | Kardos et al. | 204/52.1 |
| 4,652,348 | 3/1987 | Yahalom et al. | 204/40 |
| 4,923,574 | 5/1990 | Cohen | 204/40 |

FOREIGN PATENT DOCUMENTS

| | | |
|---|---|---|
| 633780 | 12/1949 | United Kingdom . |
| 957778 | 5/1964 | United Kingdom . |
| 1181964 | 2/1970 | United Kingdom . |
| 1330967 | 3/1971 | United Kingdom . |
| 2059438 | 4/1981 | United Kingdom . |
| 2193973 | 2/1988 | United Kingdom . |

OTHER PUBLICATIONS

U. Cohen et al., Electroplating of Cyclic Multilayered Alloy (CMA) Coatings, *J. Electrochem. Soc.*, vol. 130, No. 10, Oct. 1983, pp. 1987–1995.

Dennis Tench et al., Enhanced Tensile Strength for Electrodeposited Nickel-Copper Multilayer Composites, *Metallurgical Transactions A*, vol. 15A, Nov. 1984, pp. 2039–2040.

Joseph Yahalom et al., Formation of Composition-Modulated Alloys by Electrodeposition, *Journal of Materials Science 2* (1987), pp. 499–503.

Abner Brenner, *Electrodeposition of Alloys*, vol. II, Academic Press, New York, 1963, p. 26.

A. Kenneth Graham, *Electroplating Engineering Handbook*, second edition, Reinhold Publishing Corp., New York, 1962, p. 55.

*Primary Examiner*—John Niebling
*Assistant Examiner*—William T. Leader
*Attorney, Agent, or Firm*—Darby & Darby

[57] ABSTRACT

A method of making a plain bearing sliding layer for use in internal combustion engines, comprising the immersion of a metal substrate in a chemical solution containing copper, tin and lead salts to which is added one of the compounds represented by the following three exemplary structures:

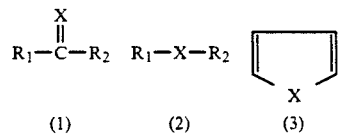

(1)    (2)    (3)

where X is one of the chemical elements selected from sulphur and nitrogen, —C represents one carbon atom, and radicals $R_1$ and $R_2$ represent the allowed variations, from a single hydrogen atom up to the typical structures of inorganic compounds or aliphatic, aromatic or cyclic chain organic radicals. The chemical solution is subjected to an electric current with a density and potential controlled as a function of time, thereby effecting the selective electrodeposition of the solution elements on the substrate so as to form successive and alternate layers of softer material and harder material. Each of the layers of softer metal is a Cu-Sn-Pb alloy layer and each of the layers of harder material is a pure copper or a Cu-Su alloy layer.

4 Claims, 2 Drawing Sheets

METHOD OF MAKING A PLAIN BEARING SLIDING LAYER

BACKGROUND OF THE INVENTION

The present invention relates to a method for making a plain bearing for use in internal combustion engines. More particularly, the present invention relates to a method for making the sliding layer of bearings having a high load capacity, intended for use in connecting rods and crankshafts.

Generally, the metal multilayer plain bearings are composed of a backing layer, mostly of steel or aluminum, an intermediate layer, usually of aluminum or a copper based alloy, in some designs a diffusion or bonding layer, generally of copper, nickel, Cu-Sn or Cu-Zn alloys, and a sliding layer, generally a copper-tin-lead alloy. A tin based anti-corrosion layer may be deposited on the sliding layer. Bearings having these construction features are well known and described in the literature, such as, for instance, in *Metals Handbook*, in chapter "Materials for Sliding Bearings", more particularly in the paragraph entitled "Laminated Construction".

Generally, these bearings are made by means of the successive deposition, beginning with the intermediate layer, of several layers applied by various methods such as casting, sintering, electroplating or sputtering. The electroplating method is the most widely used method. In this method, the bearings are subjected in succession to chemical solutions containing the elements or alloys which are deposited in layers until the bearing is formed.

Recently, aiming at the improvement of the structural strength of the plain bearings, especially their sliding layer, applicant developed a special structure for this sliding layer made up of alternate layers of softer material and layers of harder material, thereby forming a laminate structure.

This contruction concept is disclosed and illustrated in Brazilian patent application No. 8804586 filed Oct. 17, 1988. According to the disclosure, the layers of softer material are of a Cu-Sn-Pb alloy, and the layers of harder material are of pure copper or a copper-tin alloy. This sliding layer structure reinforced with copper or a copper-tin alloy exhibits improved properties as regards load capacity, which translates into a higher fatigue resistance, while maintaining other desirable characteristics such as embeddability of foreign particles contained in the lubricating oil, and conformability to compensate for shaft misalignments. According to the application, the methods to be employed are casting, electroplating or sputtering. While efficient, all processes other than electroplating are not economically practical. In turn, the conventional electroplating method for making the laminate structure sliding layer requires the deposition to be performed in at least two solutions, which makes it a slow, complicated and costly method, demanding large manufacturing space and intensive maintenance of the electroplating solution.

SUMMARY OF THE INVENTION

Therefore, it is the object of the present invention to provide a method for forming by electroplating a laminate sliding layer, the said method being more efficient, rapid and economic, which improves the quality of the bearings thus obtained as compared to the properties of the bearings made by conventional methods.

It is the principal object of the present invention to provide a method for forming a plain bearing sliding layer exhibiting a laminate multilayer structure. According to the method of the invention, the metal substrates to be subjected to electroplating are immersed in one sole chemical solution containing all elements required for making up the several layers which compose the sliding layer laminate structure. Still according to said method, the selective deposition of the elements composing the layers of softer material and harder material is performed by means of the control of the electric potentials and current densities applied to the chemical solution as a function of the application time.

It is a further object of the present invention to provide a plain bearing whose sliding layer, having a laminate structure, exhibits improved properties of resistance to fatigue and wear.

BRIEF DESCRIPTION OF THE DRAWINGS

These and other objects will be hereinafter described with reference to the accompanying drawings where.

DESCRIPTION OF THE PREFERRED EMBODIMENTS

According to the invention, a solution containing mainly copper, tin and lead salts is prepared. To this solution is added a certain amount of one of the compounds represented by the following three basic structures:

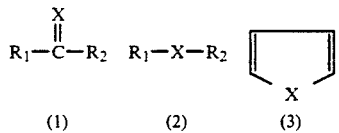

where x represents the position occupied by one of the chemical elements selected from sulphur and nitrogen. Position -C represents one carbon atom.

Each radical $R_1$ and $R_2$ can be defined by a single hydrogen atom or by aliphatic, aromatic or cyclic chain organic radicals.

By successively eliminating these radicals, one at a time, atom-X is allowed to form single, Double or triple links with atom-C, always in conformance with the link valance theory. It is understood that the hydrogen atom integrates the basic structures when it is necessary to complete the chemical valance of both atom-C and the atom-X, subject to the priority of links with radicals. In the basic structure (3, above, the cyclic chain of four carbons and one atom-X was used as an example only. This means that the cyclic chains may contain four or more carbon atoms, and also radicals $R_1$ and $R_2$ may be linked to any carbon atoms in the cyclic chain. Likewise, there is no hindrance for atom-X to be repeated in other positions of the basic chemical structure of radicals $R_1$ and $R_2$.

As examples of compounds exhibiting this type of molecular structure and the sulphur atom occupying the position X, one may mention the thionicotinamide, thioisonicotinamide, 1-alkyl-2-thiourea, thiourea, thiophene and thiosemicarbizide. One of such compounds is added to the solution in the amount of 0.2 to 5.0 grams/liter. Thereafter, the metal substrates to be subjected to electroplating are immersed in the solution whose temperature is controlled at about 25° to 30° C. Thereafter, an electric current with a density between 0 and 80 A/dm$^2$ and $-1.5$ to $+0.5$ volt potential measured against a saturated calomel electrode is applied to the solution. The successive and multilayer electrodeposition is then carried out with alternate layers of a softer material, a Cu-Sn-Pb alloy, and harder material, pure copper or a Cu-Sn alloy, by controlling the potential or electric current as a function of time. The compound added to the solution accelerates the growth and adhesion of the copper, or Cu-Sn, layers, interposed between the Cu-Sn-Pb layers.

Figure 1:
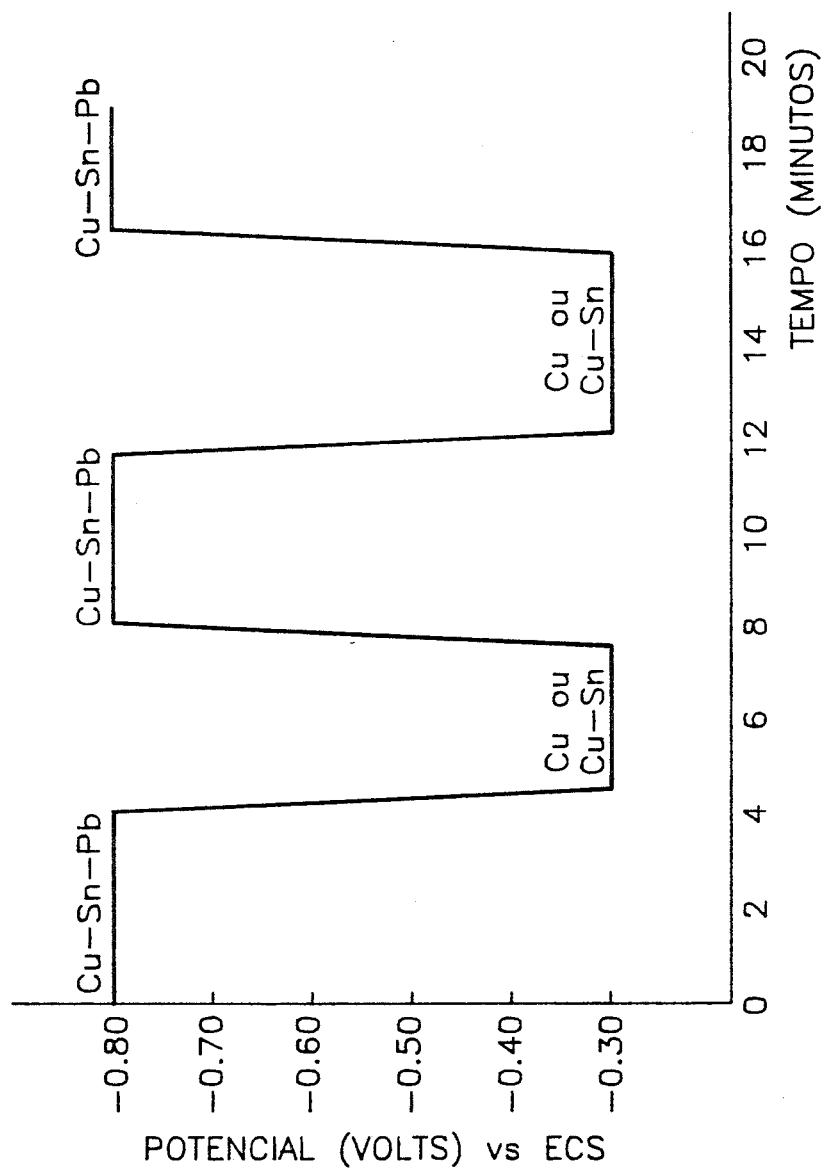
FIG. 1 is an exemplary schematic representation of the parameters employed for performing the method of the invention.

In one exemplary embodiment of the present invention performed in accordance with the operating parameters illustrated schematically in the graph of FIG. 1, a solution containing 165 to 200 grams/liter of lead fluoborate—Pb (BF$_4$)$_2$, 20 to 25 grams/liter tin fluoborate—Sn (BF$_4$)$_2$, 7.5 to 11 grams/liter of copper fluoborate—Cu (BF$_4$)$_2$, and 0.2 to 5.0 grams/liter thiourea. Thereafter, a successive and alternate electrodeposition of Cu-Sn-Pb layers and pure copper or a Cu-Sn alloy layers was carried out, pursuant to the parameters of temperature, current density and electric potentials shown in the graph of FIG. 1.

Figure 2:
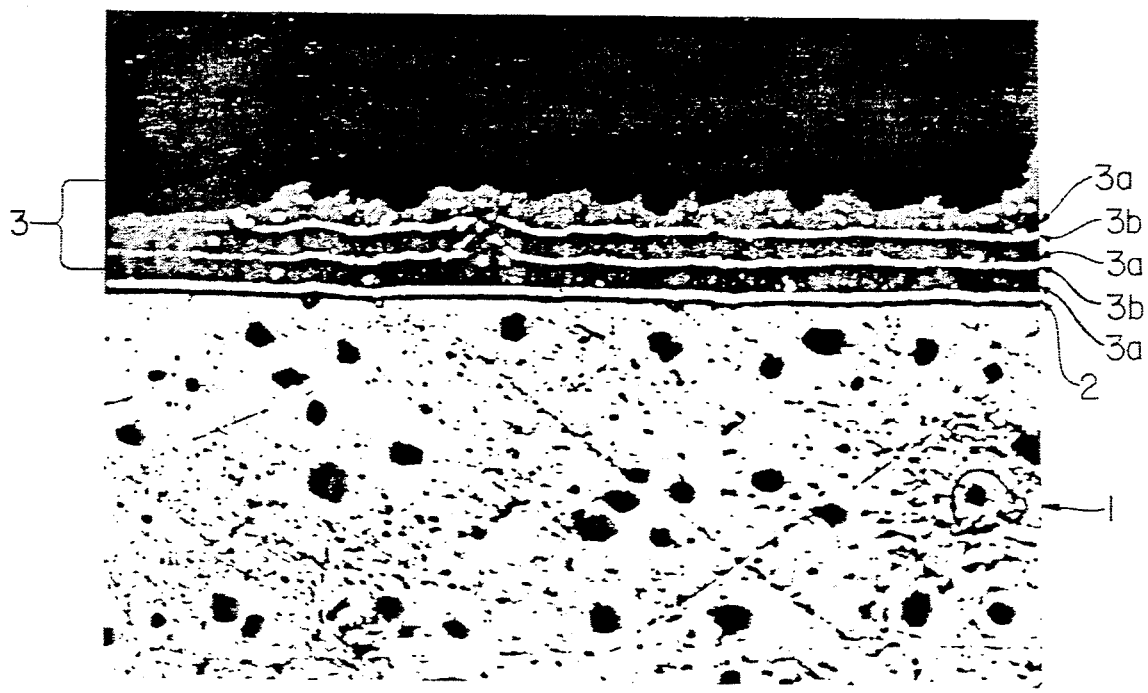
FIG. 2 is a cross section view of the laminate sliding layer obtained by the method of the present invention, represented by a micrograph magnified 580 times.

The sliding layer obtained by the method of the present invention is illustrated in FIG. 2, showing the intermediate layer 1, the diffusion or bonding layer 2, and the sliding layer 3, exhibiting a laminate structure composed of several alternate layers of a Cu-Sn-Pb alloy 3$a$ and Cu or a Cu-Sn alloy 3$b$. The uppermost and lowermost layers 3$a$ of sliding layer 3 are always of a softer material, a Cu-Sn-Pb alloy. The total thickness of the laminate sliding layer 3 is generally between 2 and 30 $\mu$m. The thickness of each layer of a softer material 3$a$, a Cu-Sn-Pb alloy, is between 1 and 20 $\mu$m.

The thickness of each layer of a harder material, pure copper or a Cu-Sn alloy, is between 0.3 and 4 $\mu$m. The number of layers of softer material and harder material shown in FIG. 2 is merely exemplary. The layers may be present in any number as a function of the bearing load conditions.

We claim:

1. A method of making a plain bearing sliding layer laminate including copper, tin and lead, comprising the steps of:
    immersing a metal substrate in a single chemical solution prepared from the salts of copper, tin and lead and an organic compound for electrodeposition on said substrate;
    applying an electrical potential for producing an electric current in said chemical solution; and
    effecting selective electrodeposition of said elements on said substrate by controlling the chemical potential by varying the current in the solution as a cyclic function of time to form successive and alternate layers of softer material and harder material on said substrate wherein each of the layers of softer material is a Cu-Sn-Pb alloy layer and each of the layers of harder material is a material selected from the group consisting of pure copper and Cu-Sn alloys.

2. The method defined in claim 1, the chemical solution consisting essentially of copper, tin and lead salts, said organic compound being selected from the group consisting of compounds represented by the following structures:

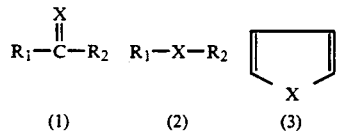

(1)      (2)      (3)

wherein X represents the position occupied by one of the chemical elements selected from sulphur and nitrogen, C represents one carbon atom, and R$_1$ and R$_2$ represent respectively a radical selected from a single hydrogen atom and aliphatic, aromatic and cyclic chain radicals.

3. The method defined in claim 2, wherein the content of the organic compound present in the chemical solution is from 0.2 to 5.0 grams/liter.

4. The method defined in claim 2, wherein the chemical solution is maintained at a temperature between about 25° and about 30° C., and subjected to an electric current with a density from 0 to 80 A/dm$^2$ and $-1.5$ to $+0.5$ volt potential versus a saturated calomel electrode.

* * * * *

UNITED STATES PATENT AND TRADEMARK OFFICE
CERTIFICATE OF CORRECTION

PATENT NO. : 5,156,729

DATED : October 20, 1992

INVENTOR(S) : Duraid Mahrus; Ademir Carubelli

It is certified that error appears in the above-identified patent and that said Letters Patent is hereby corrected as shown below:

On title page, item [73] delete

"Metal Leve, S. A." and substitute therefor

--Metal Leve S. A. Indústria e Comércio--.

Signed and Sealed this

Twenty-seventh Day of September, 1994

Attest:

BRUCE LEHMAN

Attesting Officer     Commissioner of Patents and Trademarks